(12) United States Patent
Baker et al.

(10) Patent No.: US 10,004,088 B2
(45) Date of Patent: *Jun. 19, 2018

(54) METHOD FOR SIGNALLING RANDOM ACCESS CHANNELS

(71) Applicant: KONINKLIJKE PHILIPS N.V., Eindhoven (NL)

(72) Inventors: Matthew P. J. Baker, Canterbury (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/164,987

(22) Filed: Jan. 27, 2014

(65) Prior Publication Data

US 2014/0140303 A1    May 22, 2014

Related U.S. Application Data

(63) Continuation of application No. 12/739,167, filed as application No. PCT/IB2008/005442 on Oct. 27, 2008, now Pat. No. 8,638,734.

(30) Foreign Application Priority Data

Oct. 31, 2007 (EP) .................................. 07301518
Jan. 8, 2008 (EP) .................................. 08300012

(51) Int. Cl.
*H04W 74/08* (2009.01)
*H04W 74/00* (2009.01)

(52) U.S. Cl.
CPC ..... *H04W 74/0833* (2013.01); *H04W 74/002* (2013.01); *H04W 74/0866* (2013.01)

(58) Field of Classification Search
CPC ......... H04W 74/0833; H04W 72/0413; H04W 72/04; H04W 72/005; H04W 74/002;
(Continued)

(56) References Cited

U.S. PATENT DOCUMENTS 5,430,760 A    7/1995 Dent
6,708,037 B1 *  3/2004 Moulsley et al. ......... 455/452.1
(Continued)

FOREIGN PATENT DOCUMENTS

WO    2001010157 A1    2/2001
WO    2007023044 A1    3/2007
(Continued)

OTHER PUBLICATIONS

RAN1, "LS on RAN1 Conclusions on Enhanced Uplink for CELL_FACH State in FDD", 3GPP TSG RAN WG1 Meeting #50Bis, R1-074522, China, 2007, pp. 1-2.
(Continued)

*Primary Examiner* — Awet Haile

(57) ABSTRACT

In UMTS WCDMA a new RACH-based uplink is being discussed. The resources defined for this new "E-RACH" need to be signalled to the UE. This should avoid disturbing the signalling to existing terminals, i.e. that are not aware of E-RACH. This could be done for E-RACH by repeating the kind of signalling defined for R99 RACH and transmitted on the BCH (Broadcast Control Channel). However, this would imply a significant extra load on the BCH, which is undesirable.

The invention is based on the recognition that E-DCH resources can be defined efficiently at least partly with reference to the R99 RACH resources. This can be done in such a way that no additional signalling is required on the BCH.

44 Claims, 1 Drawing Sheet

(58) Field of Classification Search
CPC ... H04W 72/00; H04W 28/26; H04W 72/046; H04W 72/0466; H04L 5/0073; H04L 1/003; H04B 7/0606
USPC ..... 370/312, 320, 328, 342; 455/450, 452.1, 455/509
See application file for complete search history.

(56) References Cited

U.S. PATENT DOCUMENTS

| | | | |
|---|---|---|---|
| 8,054,791 B2 | 11/2011 | Vujcic | |
| 2001/0026539 A1* | 10/2001 | Kornprobst et al. | 370/329 |
| 2002/0041578 A1* | 4/2002 | Kim et al. | 370/335 |
| 2007/0047513 A1 | 3/2007 | Anderson | |
| 2007/0147310 A1* | 6/2007 | Cai | 370/335 |
| 2008/0101305 A1* | 5/2008 | Cave et al. | 370/336 |
| 2008/0225785 A1* | 9/2008 | Wang et al. | 370/329 |
| 2009/0041240 A1* | 2/2009 | Parkvall et al. | 380/247 |
| 2009/0325585 A1* | 12/2009 | Farajidana et al. | 455/450 |
| 2010/0182974 A1* | 7/2010 | Barraclough et al. | 370/329 |
| 2011/0019655 A1* | 1/2011 | Hakola | 370/342 |
| 2011/0170459 A1* | 7/2011 | Anderson | 370/280 |

FOREIGN PATENT DOCUMENTS

| | | |
|---|---|---|
| WO | 2007052968 A1 | 5/2007 |
| WO | 2007073040 A1 | 6/2007 |

OTHER PUBLICATIONS

Nokia Corporation, "Resource Assignment for E-DCH Access in CELL_FACH State", 3GPP TSG-RAN WG2 Meeting #60, R2-074626, Korea, 3007, pp. 1-5.

"Radio Resource Control (RCC); Protocol Specification (Release 6)", 3GPP TS 25.331 V6.8.0, 2005, pp. 459-461, 566-568, 598-602.

Qualcomm Europe, "Layer 1/2 Aspects for Enhanced UL for CELL_FACH", 3GPP TSG-RAN WG2 #59Bis, R2-074390, China, 2007, pp. 1-9.

LG Electronics, "Discussion on RACH Enhancements", 3GPP TSG-RAN WG2 #59Bis, R2-074165, China, 2007, pp. 1-2.

Philips, "RACH Access for Enhanced Uplink in CELL_FACH", 3GPP TSG RAN WG2 Meeting #60, Jeju, Korea, 2007, R2-075163, pp. 1-3.

Samsung, NTT DoCoMo, "Pathloss & S ize in RACH Signature", EGPP TSG-RAN2 Meeting #57, TDOC R2-071171, 2007, pp. 1-3.

* cited by examiner

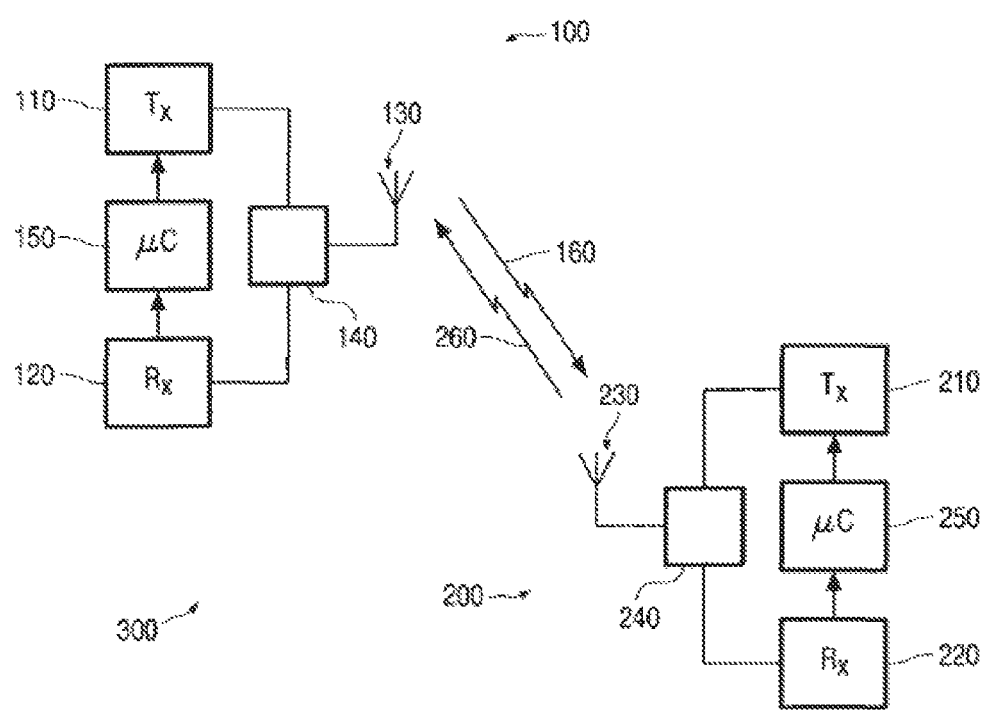

METHOD FOR SIGNALLING RANDOM ACCESS CHANNELS

This application claims the benefit or priority of and describes relationships between the following applications: wherein this application is a continuation of U.S. patent application Ser. No. 12/739,167, filed Apr. 22, 2010, which is the National Stage of International Application No. PCT/IB2008/054424, filed Oct. 27, 2008, which claims the priority of foreign applications EP07301518.2 filed Oct. 31, 2007, and EP 08300012.5 filed Jan. 8, 2008, all of which are incorporated herein in whole by reference.

This invention relates to a method for signalling Access Channels, like random access channels, a primary station and a secondary station implementing such a method. This invention concerns more specifically mobile networks like GSM, or UMTS or UMTS LTE networks.

In UMTS WCDMA there is a mechanism defined for Random Access transmission in the uplink. The User Equipment UE (namely the mobile station) transmits a randomly-selected preamble signal characterised by:

Signature sequence (i.e. bit sequence)
Scrambling code,
Sub-channel (i.e. timing of the access slot in the frame)

If the base station receives the signature it acknowledges it on the Acquisition Indicator Channel (AICH). If the UE receives a positive acknowledgement it transmits a message part on a RACH data channel.

If the UE does not receive an acknowledgement it can make another attempt.

The probability of collision depends on the number of Signature sequences, Scrambling codes, Access slots from which the UEs make their selection for the randomly-selected preamble signal.

Currently in 3GPP it is proposed that UEs can be configured to use a new mechanism, which is similar to RACH. For the purpose of this invention, the main difference is that the data transmission uses a high-speed uplink packet data channel, known as Enhanced Dedicated Channel (E-DCH), instead of a single short message associated directly with the RACH preamble. Unlike the RACH message, the E-DCH is characterised by power control, rate control, hybrid ARQ and the ability to transmit high data rates for an indefinite length of time, but in practice the detailed characteristics are not relevant to this invention.

For convenience we can refer to the existing RACH as "R99 RACH" and the new scheme as "E-RACH".

The resources from which the UE is permitted to make a random selection for the R99 RACH preamble signal transmission are broadcast on a broadcast channel (BCH) in each cell. The R99 RACH parameters which are signalled on the BCH are included for reference in the table below. This information is provided for one of more PRACHs (Physical RACHs):

| Information Element/Group name | Need | Multi | Type and reference | Semantics description | Version |
|---|---|---|---|---|---|
| >>Available Signature | MP | | Bit string (16) | Each bit indicates availability for a signature, where the signatures are numbered "signature 0" up to "signature 15". The value 1 of a bit indicates that the corresponding signature is available and the value 0 that it is not available. | |
| >>Preamble scrambling code number | MP | | Integer (0 . . . 15) | Identification of scrambling code] | |
| >>Available Sub Channel Number | MP | | Bit string (12) | Each bit indicates availability for a subchannel, where the subchannels are numbered "subchannel 0" to "subchannel 11". The value 1 of a bit indicates that the corresponding subchannel is available and the value 0 indicates that it is not available. | |

This information comprises a relatively large number of bits which have to be transmitted with sufficient power to be received throughout the cell. This represents a high overhead.

One object of the invention is to solve the problem of how to define and signal the resources available for E-RACH preamble selection without causing a further large increase in the amount of broadcast signalling in each cell.

In accordance with a first aspect of the invention, a method is proposed for communicating between a primary station and a secondary station comprising a step of signalling two random access channels of different types based on a difference of resources for the two random access channels.

These and other aspects of the invention will be apparent from and will be elucidated with reference to the embodiments described hereinafter.

The present invention will now be described in more detail, by way of example, with reference to the accompanying drawing, wherein:

FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 or an antenna array comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 or an antenna array comprising a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

There are a couple of possibilities for resource definition:
The resources for E-RACH (i.e. Signature sequence, Scrambling code, sub-channel) could be provided by using some of those available for R99 RACH. However, this would have the effect of raising the probability of collision (assuming no reduction in R99 RACH access attempts). This approach is already discussed in 3GPP.
The resources for E-RACH are defined in addition to those for R99 RACH (i.e. one or more of the sets of Signature sequence, Scrambling code or Access slot are different to the set available for R99 RACH).

It should also be noted that the signalling of resources E-RACH should avoid disturbing the signalling to legacy terminals, which are not aware of E-RACH. This could be done for E-RACH by repeating the kind of signalling defined for R99 RACH and transmitted on the BCH (Broadcast Control Channel). However, this would imply a significant extra load on the BCH, which is undesirable. Therefore there will be some interest in a more efficient method of signalling.

The invention is based on the recognition that E-RACH resources can be defined efficiently at least partly with reference to the R99 RACH resources. This can be done in such a way that no (or very little) additional signalling is required on the BCH.

In general the invention involves indicating the E-RACH resources by means of a signalled or predetermined difference from the R99 RACH resources.

If the difference is fully predetermined then no additional signalling is required.

In practice a combination of signalling and predetermination may be used.

In a typical embodiment, the invention is applied in UMTS WCDMA. Resources for each PRACH are broadcast using the BCH. Some UEs are configured to use E-RACH, for example by means of higher-layer signalling.

In a preferred embodiment, the resources available for E-RACH for the configured UEs are given by the same set(s) of signatures and sub-channels as for each PRACH, but the scrambling code is different.

The availability (or not) of E-RACH resources may therefore be indicated by a single broadcast bit. If the bit is set, the scrambling code is predetermined as being one of a group of scrambling codes pre-defined for E-RACH. The specific scrambling code(s) for E-RACH is (are) determined by a pre-defined one-to-one mapping from the PRACH scrambling code(s).

As a variation of this embodiment the scrambling code used by the UE for E-RACH is signalled, or is UE-specific.

In another embodiment, the invention may comprise signalling a difference in the set of signatures and/or the set of sub-channels, for example by adding one or more signatures and/or sub-channels to the set available for R99 RACH, or by removing one or more signatures and/or sub-channels from the set available for R99 RACH.

In a specific such embodiment based on WCDMA, the resources for E-RACH are the same as for each PRACH, except that the bit-map indicating the available signatures for each PRACH is inverted to indicate the signatures for E-RACH. This has the advantage that no new functionality is needed at the base station, and the resources for R99 RACH and E-RACH are automatically distinguishable from the signature. In a variation of this embodiment the bit map of PRACH sub-channels is inverted to give the E-RACH sub-channels.

The E-RACH resources will need to be broadcast in the cell. However, it is important to avoid excessive additional loading on the BCH, and efficient ways of signalling should be found. Preferably, it should not be necessary to duplicate for E-RACH all the PRACH system information which is already present on the BCH.

Moreover, the signalling of E-RACH resources must not affect the signalling for R99 RACH access, so that legacy UEs are unaffected.

Having defined an additional set of scrambling codes for E-RACH, one possibility for a low-overhead way to broadcast the E-RACH resource allocation would be to assume that the same resources are available in terms of signatures and subchannels as for R99 RACH, and simply indicate the new scrambling code(s) that are to be used for E-RACH. Legacy UEs would ignore this information, while Release 8 UEs would read the normal PRACH system information to find out which signatures and sub-channels should be used with the new scrambling code(s).

According to another aspect of the invention, joint coding of multiple differences between resources for RACH and E-RACH is used. This aspect of the invention is based on the recognition that an information element indicating a first parameter describing the E-RACH resources could not take the same value as for a RACH resource if all other parameters describing the resources were the same between E-RACH and RACH (otherwise the same resources would be described for both E-RACH and RACH). The value of the E-RACH resource parameter which is the same as the RACH resource parameter can therefore be reinterpreted to indicate that a different resource parameter is modified for E-RACH relative to RACH. The different resource parameter which is modified, and the way in which it is modified, can be signalled separately or predetermined. In one embodiment, the first parameter indicates the identity of a scrambling code to be used for E-RACH. If this parameter indicates a scrambling code configured (in the same message, or in some embodiments in a different message) for RACH, the parameter is defined to mean that the set of signatures for E-RACH in combination with the said scrambling code is different from the set of signatures for RACH in combination with the said scrambling code. In a preferred case of this embodiment, the difference between the sets of signatures is predetermined such that the two sets are mutually exclusive and together comprise the whole set of available signatures—in other words, that a bit map describing the set of available signatures for E-RACH is obtained by inverting the bit map describing the set of available signatures for RACH. An example of this embodiment is given below:

| Information Element/Group name | Need | Multi | Type and reference | Semantics description | Version |
|---|---|---|---|---|---|
| CHOICE mode | MP | | | | |
| >FDD | | | | | |
| >>Available Signature | MP | | Bit string (16) | Each bit indicates availability for a signature, where the signatures are numbered "signature 0" up to "signature 15". The value 1 of a bit indicates that the corresponding signature is available and the value 0 that it is not available. | |
| >>Available SF | MP | | Integer (32, 64, 128, 256) | In chips per symbol Defines the minimum allowed SF (i.e. the maximum rate) | |
| >>Preamble scrambling code number | MP | | Integer (0 . . . 15) | Identification of scrambling code see [28] | |
| >>PRACH resource allocation for E-DCH in CELL_FACH | OP | | Integer (0 . . . 15) | Identification of scrambling code for PRACH for E-DCH in CELL_FACH see [28]. If the value of this IE is equal to Preamble scrambling code number, the available signatures for PRACH for E_DCH in CELL_FACH are derived by inverting the bit string for the IE Available Signature, otherwise the available signatures for PRACH for E_DCH in CELL_FACH are given directly by the bit string for the IE Available Signature. | Rel-8 |
| >>Puncturing Limit | MP | | Real (0.40 . . . 1.00 by step of 0.04) | | |
| >>Available Sub Channel Number | MP | | Bit string (12) | Each bit indicates availability for a subchannel, where the subchannels are numbered "subchannel 0" to "subchannel 11". The value 1 of a bit indicates that the corresponding subchannel is available and the value 0 indicates that it is not available. | |

In this example, the parameter "Preamble scrambling code number" indicates the scrambling code used for RACH, and the parameter "PRACH resource allocation for E-DCH in CELL_FACH" indicates the scrambling code used for E-RACH. Both parameters are integers which may take a value between 0 and 15. If the value of the parameter "PRACH resource allocation for E-DCH in CELL_FACH" is the same as the value of the parameter "Preamble scrambling code number", then the set of available signatures for E-RACH is obtained by inverting the bit string "Available Signature" for RACH, otherwise the set of signatures for E-RACH are the same as indicated by the bit string "Available Signature".

In another similar example, when RACH and E-RACH use different scrambling codes, the set of signatures could be determined independently (for example by signalling independent information elements).

The invention claimed is:
1. A method of operating a secondary station for communicating in a network with a primary station, the method comprising:

a processor of the secondary station transmitting one of a first signal or a second signal;
in the case where the processor of the secondary station transmits a first signal, the first signal is transmitted through a transceiver and array of antennas of the secondary station from the secondary station to the primary station over a first random access channel of a first type, the first random access channel having a first resource set available for the first type of random access channel;
in the case where the processor transmits a second signal, the second signal is transmitted through the transceiver and antennas from the secondary station to the primary station over a second random access channel of a second type, the second random access channel having a second resource set available for the second type of random access channel;
wherein a difference between the first and second resource sets comprises a difference of at least one of:
scrambling code and signature set and sub-channel;
scrambling code and signature set; or
signature set and sub-channel, and
wherein the signature set in the second resource set is obtained by inverting a bit map describing the signature set in the first resource set.

2. The method of claim 1, wherein the method comprises receiving information from the primary station concerning at least one of: the first resource set; or the second resource set.

3. The method of claim 1, wherein the method comprises receiving information from the primary station concerning the second type random access channel.

4. The method of claim 2, wherein the received information comprises a received indication of whether a difference of resources for the second type random access channel is available or not.

5. The method of claim 1, wherein the difference in resources used for the second type random access channel is at least one of:
predetermined; and
derived by a predetermined one-to-one mapping from the combination of resources used for the first type random access channel.

6. The method of claim 5, wherein the predetermined one-to-one mapping is received by and/or is specific to a particular secondary station or group of secondary stations.

7. The method of claim 4, wherein the received indication of whether a difference of resources for the second type random access channel is available or not comprises a single bit.

8. The method of claim 1, wherein at least one aspect of the resources available for the second type random access channel comprises those not available for the first type random access channel out of a predetermined larger set.

9. The method of claim 2, wherein the information concerning the at least one of: the first resource set; or the second resource set; comprises broadcast signaling.

10. The method of claim 2, wherein the received information concerning the first resource set comprises broadcast signaling received from the primary station; and the information concerning the second resource set comprises signaling received from the primary station addressed to a specific secondary station or group of secondary stations.

11. A primary station for communicating in a network with a secondary station, primary station comprising:
a transceiver;
an array of at least one antenna; and
a processor operative to control the transceiver to transmit and receive signals through the transceiver and antenna array, to:
receive a first signal from a secondary station over a first random access channel of a first type of a first resource set available for the first type random access channel; or
receive a second signal from the secondary station over a second random access channel of a second type of a second resource set available for the second type of random access channel; and
wherein a difference between the first and second resource sets comprises a difference of at least one of:
scrambling code and signature set and sub-channel;
scrambling code and signature set; or
signature set and sub-channel; or combinations thereof, and
wherein the signature set in the second resource set is obtained by inverting a bit map describing the signature set in the first resource set.

12. A secondary station for communicating in a network with a primary station, the secondary station comprising:
a transceiver;
an array of at least one antenna; and
a processor operative to control the transceiver to transmit and receive signals through the transceiver and antenna array, to:
transmit a first signal to a primary station over a first random access channel of a first type of a first resource set available for the first type of random access channel; or otherwise
transmit a second signal to the primary station over a second type random access channel having a second resource set available for the second type random access channel; and
wherein the difference in resource sets comprises a difference of at least one of:
scrambling code and signature set and sub-channel;
scrambling code and signature set; or
signature set and sub-channel; or combinations thereof and
wherein the signature set in the second resource set is obtained by inverting a bit map describing the signature set in the first resource set.

13. The secondary station of claim 12, wherein the processor receives information from the primary station concerning at least one of: the first resource set; or the second resource set.

14. The secondary station of claim 13, wherein the information concerning the at least one of the first resource set and the second resource set is communicated via broadcast signaling.

15. The secondary station of claim 13, wherein the information concerning the first resource set is communicated via broadcast signaling from the primary station and the information concerning the second resource set is communicated via signaling from the primary station addressed to a specific secondary station or group of secondary stations.

16. The secondary station of claim 13, wherein the information comprises an indication of whether a difference of resources for the second type random access channel is available.

17. The secondary station of claim 16, wherein the indication of whether a difference of resources for the second type of random access channel is available comprises a single bit.

18. The secondary station of claim 12, wherein the difference in resources used for the second type random access channel is at least one of:
  predetermined; or
  derived by a predetermined one-to-one mapping from the combination of resources used for the first type random access channel.

19. The secondary station of claim 18, wherein the predetermined one-to-one mapping is at least one of:
  signaled; or
  specific to particular secondary station or group of secondary stations; or combinations thereof.

20. The secondary station of claim 12, wherein at least one aspect of the resources available for the second type random access channel comprises those not available for the first type random access channel out of a predetermined larger set.

21. A method of operating a primary station for communicating in a network with a secondary station, the method comprising:
  a processor of the primary station receiving a first signal through a transceiver and an array of at least one antenna of the primary station from a secondary station over a first random access channel of a first type of a first resource set available for the first type of random access channel; and
  the processor otherwise receiving a second signal through the transceiver and antenna array from the secondary station over a second random access channel of a first type of a second resource set available for the second type of random access channel;
  wherein a difference between the first and second resource sets comprises a difference of at least one of:
    scrambling code and signature set and sub-channel;
    scrambling code and signature set; or
    signature set and sub-channel; or combinations thereof and
  wherein the signature set in the second resource set is obtained by inverting a bit map describing the signature set in the first resource set.

22. The method of claim 21, comprising transmitting information to the secondary station concerning at least one of: the first resource set; or the second resource set.

23. The method of claim 21, wherein the method comprises transmitting information to the secondary station concerning the second type random access channel.

24. The method of claim 22, wherein the transmitted information comprises a transmitted indication of whether a difference of resources for the second type random access channel is available or not.

25. The method of claim 22, wherein the transmitted information concerning the first resource set comprises broadcast signaling from the primary station; and the information concerning the second resource set comprises signaling from the primary station addressed to a specific secondary station or group of secondary stations.

26. A tangible computer-readable storage medium that is not a transitory propagating signal or wave, the medium being modified with control information including instructions for controlling a secondary station for performing a method of operating a secondary station for communicating in a network with a primary station, the method comprising:
  a processor of the secondary station transmitting one of a first signal or a second signal;
  in the case where the processor of the secondary station transmits a first signal, the first signal is transmitted through a transceiver and an array of at least one antenna from the secondary station to the primary station over a first random access channel of a first type, the first random access channel having a first resource set available for the first type random access channel;
  in the case where the processor of the secondary station transmits a second signal, the second signal is transmitted through the transceiver and antenna from the secondary station to the primary station over a second random access channel of a second type, the second random access channel being available for the second type random access channel;
  wherein a difference between the first and second resource sets comprises a difference of at least one of:
    scrambling code and signature set and sub-channel;
    scrambling code and signature set; or
    signature set and sub-channel, and
  wherein the signature set in the second resource set is obtained by inverting a bit map describing the signature set in the first resource set.

27. A tangible computer-readable storage medium that is not a transitory propagating signal or wave, the medium being modified with control information including instructions for performing method of operating a primary station for communicating in a network with a secondary station, the method comprising:
  a processor of the primary station receiving a first signal through a transceiver and an array of antennas of the primary station from a secondary station over a first type random access channel of a first resource set available for the first type random access channel; and
  the processor otherwise receiving a second signal through the transceiver and antennas from the secondary station over a second type random access channel having a second resource set available for the second type random access channel;
  wherein the difference between the first and second resource sets comprises a difference of at least one of:
    scrambling code and signature set and sub-channel;
    scrambling code and signature set; or
    signature set and sub-channel; and
  wherein the signature set in the second resource set is obtained by inverting a bit map describing the signature set in the first resource set.

28. A method of operating a secondary station for communicating in a network with a primary station, the method comprising:
  a processor of the secondary station transmitting one of a first signal or a second signal;
  in the case where the processor of the secondary station transmits a first signal, the first signal is transmitted through a transceiver and array of at least one antenna of the secondary station and through a first random access channel of a first type of a first set of resources to a primary station; and
  in the case where the processor of the secondary station transmits a second signal, the second signal is transmitted through the transceiver and antenna array and through a second random access channel of a second type, the second random access channel having a second resource set different from the first resource set, and
  wherein information received by the secondary station from the primary station concerning the second resource set comprises difference information indicating a difference between the first set of resources and the second set of resources, wherein the first and second resource sets have at least one resource in common, wherein the secondary station determines a resource of the second resource set using the first set of resources, and the difference information being at least one of: predetermined difference information available in the secondary station; difference information signaled to the secondary station for a following communication from the secondary station to the primary station, or a combination of predetermined and signaled information, wherein said predetermined difference information comprises a predetermined difference in at least one resource or a predetermined difference in a number of resources between the first set of resources and the second set of resources, wherein the difference information signaled to the secondary station comprises a difference in a number of resources between the first set of resources and the second set of resources, and wherein the first resource set and said predetermined information are known to the secondary station when transmitting the second signal to the primary station.

29. The method of claim 28, wherein the difference information comprises an indication of a difference in a combination of resources of the first and second sets of resources, the combination comprising at least one of: scrambling codes, signature sets, or sub-channels.

30. The method of claim 29, comprising the processor modifying the first set of resources to be different than the second set of resources by doing at least one of:
    adding to the first set of resources at least one of: scrambling codes, signature sets, or sub-channels; and
    removing from the first set of resources at least one of: scrambling codes, signature sets, or sub-channels.

31. The method of claim 29, wherein the method comprises receiving information from the primary station concerning at least one of: the first resource set; or the second resource set, and wherein the signal of the second random access channel comprises an indication of whether the combination of resources of the second set of resources is available or not.

32. The method of claim 31, wherein the combination used for the second set of resources is at least one of:
    predetermined; or
    derived by a predetermined one-to-one mapping from the combination used for the first random access channel.

33. The method of claim 32, wherein the predetermined one-to-one mapping is at least one of the group of:
    signaled; and
    predetermined for a particular secondary station or group of secondary stations.

34. The method of claim 29, wherein the difference information indicating a difference between the first set of resources and the second set of resources comprises a single broadcast bit.

35. The method of claim 28, wherein the resources available for the second random access channel comprise at least one of the group of: the same signatures-sets; and the same sub-channels; as for the first random access channel, and comprises a different scrambling code from that of the first random access channel.

36. The method of claim 28, wherein aspects of the resources comprise at least one of: scrambling codes, signature sets, or sub-channels; and the aspects of the resources available for the second random access channel comprise those not available for the first random access channel out of a predetermined larger set.

37. The method of claim 36, wherein the resources available for the second random access channel are obtained by inverting a bit-map describing the resources available for the first random access channel.

38. The method of claim 28, wherein the method comprises receiving information from the primary station concerning at least one of: the first resource set or the second resource set, and wherein the signals of each random access channel of the secondary station is broadcast.

39. The method of claim 28, wherein the first signal of the first random access channel is broadcast and the second signal of the second random access channel is addressed to a specific secondary station or group of secondary stations.

40. A method of operating a primary station for communicating in a network with a secondary station, comprising:
    a processor of the primary station receiving one of a first signal or a second signal,
    in the case where the processor of the primary station receives a first signal, the first signal is received through a transceiver and array of antennas of the primary station from a secondary station over a first type random access channel of a first resource set available for the first type random access channel; and
    in the case where the processer of the primary station receives a second signal, the second signal is received through the transceiver and antennas from the secondary station over a second type random access channel of a second resource set available for the second type random access channel, the second type being different from the first type, and
    wherein information received by the secondary station from the primary station concerning the second resource set comprises difference information indicating a difference between the first set of resources and the second set of resources,
    wherein the first and second resource sets have at least one resource in common,
    wherein the secondary station determines a resource of the second resource set using the first set of resources and the difference information being one of: predetermined difference information available in the secondary station, difference information signaled to the secondary station for a following communication from the secondary station to the primary station, or a combination of predetermined and signaled difference information,
    wherein said predetermined difference information comprises a predetermined difference in at least one resource or a predetermined difference in a number of resources between the first set of resources and the second set of resources,
    wherein the difference information signaled to the secondary station comprises a difference in a number of resources between the first set of resources and the second set of resources, and
    wherein the first resource set and said predetermined information is known to the secondary station when transmitting the second signal.

41. A secondary station for communicating in a network with a primary station, the secondary station comprising:
    a transceiver;
    an array of at least one antenna; and a processor controlling the transceiver to transmit and receive signals through the transceiver and antenna array, to:
  transmit a first signal from the secondary station to a primary station over a first type random access channel of a first resource set available for the first type random access channel; or otherwise
  transmit a second signal to the primary station over a second type random access channel having a second resource set available for the second type random access channel; the second type being different from the first type,
wherein the first and second resource sets have at least one resource in common,
wherein the secondary station determines the second resource set using the first set of resources and the difference information being at least one of: predetermined difference information available in the secondary station, difference information signaled to the secondary station for a following communication from the secondary station to the primary station, or a combination of predetermined and signaled difference information, and wherein the first resource set and said predetermined information is known to the secondary station when transmitting the second signal, and
wherein said predetermined difference information comprises a predetermined difference in at least one resource or a predetermined difference in a number of resources between the first set of resources and the second set of resources,
wherein the difference information signaled to the secondary station comprises a difference in a number of resources between the first set of resources and the second set of resources.

42. A primary station for communicating in a network with a secondary station, the primary station comprising:
  a transceiver;
  an array of at least one antenna; and
  a processor controlling the transceiver to transmit and receive signals through the transceiver and antenna array, to:
  receive a first signal on a first random access channel of a first type of a first set of resources; or otherwise receive a second signal on a second random access channel of a second type of second set of resources, the second type being different from the first type, and
  wherein information concerning the second resource set comprises difference information indicating a difference between the first set of resources and the second set of resources,
wherein the first and second resource sets have at least one resource in common,
wherein the secondary station determines the second resource set using the first set of resources and the difference information being at least one of: predetermined information available in the secondary station, difference information signaled to the secondary station for a following communication from the secondary station to the primary station, or a combination of predetermined and signaled difference information,
wherein said predetermined difference information comprises a predetermined difference in at least one resource or a predetermined difference in a number of resources between the first set of resources and the second set of resources,
wherein the difference information signaled to the secondary station comprises a difference in a number of resources between the first set of resources and the second set of resources, and
wherein the first resource set and said predetermined information is known to the secondary station when transmitting the second signal.

43. A tangible computer-readable storage medium that is not a transitory propagating signal or wave, the medium being modified with control information including instructions for performing a method of operating a secondary station for communicating in a network with a primary station, the method comprising:
  a processor of the secondary station transmitting one of a first signal or a second signal;
  in the case where the processor of the secondary station transmits a first signal, the first signal is transmitted through a transceiver and array of at least one antenna of the secondary station and through a first random access channel of a first type of a first set of resources to a primary station; and
  in the case where the processor of the secondary station transmits a second signal, the second signal is transmitted through the transceiver and antenna array and through a second random access channel of a second type of a second set of resources, the second type being different from the first type,
wherein the first and second resource sets have at least one resource in common,
wherein received information concerning the second signal comprises difference information indicating a difference between the first set of resources and the second set of resources,
wherein the secondary station determines the second resource set using the first set of resources and the difference information being at least one of: predetermined difference information available in the secondary station; difference information signaled to the secondary station for a following communication from the secondary station to the primary station; or a combination of predetermined and signaled information,
wherein said predetermined difference information comprises a predetermined difference in at least one resource or a predetermined difference in a number of resources between the first set of resources and the second set of resources,
wherein the difference information signaled to the secondary station comprises a difference in a number of resources between the first set of resources and the second set of resources, and
wherein the first resource set and said predetermined information is known to the secondary station when transmitting the second signal.

44. A non-transitory computer-readable storage medium that is not a transitory propagating signal or wave, the medium having stored thereon instructions that when executed cause processing circuitry of a primary station to:
  receive one of a first signal or a second signal,
  in the case where the first signal is received, the first signal is received through a transceiver and array of antennas of the primary station from a secondary station over a first type random access channel of a first resource set available for the first type random access channel; and
  in the case where the second signal, the second signal is received through the transceiver and antennas from the secondary station over a second type random access channel of a second resource set available for the second type random access channel, the second type being different from the first type, and wherein transmitted information concerning the second resource set comprises difference information indicating a difference between the first set of resources and the second set of resources, wherein the first and second resource sets have at least one resource in common, wherein the secondary station determines the second resource set using the first set of resources, and the difference information being at least one of: predetermined difference information available in the secondary station; difference information signaled to the secondary station for a following communication from the secondary station to the primary station; or a combination of predetermined and signaled information, wherein said predetermined difference information comprises a predetermined difference in at least one resource or a predetermined difference in a number of resources between the first set of resources and the second set of resources, wherein the difference information signaled to the secondary station comprises a difference in a number of resources between the first set of resources and the second set of resources, and wherein the first resource set and said predetermined information is known to the secondary station when transmitting the second signal.

* * * * *